Dec. 15, 1931.   A. NORTON   1,836,274
POULTRY FEEDER
Filed Nov. 3, 1928

INVENTOR.
AARON NORTON
BY Joseph B. Gardner
HIS ATTORNEY.

Patented Dec. 15, 1931

1,836,274

UNITED STATES PATENT OFFICE

AARON NORTON, OF APPLEGATE, CALIFORNIA

POULTRY FEEDER

Application filed November 3, 1928. Serial No. 316,921.

An object of the invention is to provide a feeder of the character described which may be stored and shipped in knockdown form, and may be quickly and easily assembled or disassembled by unskilled persons without the use of special tools.

Another object of the invention is to provide a feeder which is so constructed that while the poultry may at all times have, in ease and comfort, the necessary access to the feed therein for the purpose of feeding, they will be prevented from raking or otherwise wastefully removing the feed therefrom.

A still further object of the invention is to provide an efficient feeder which is of extremely light and simple construction, yet is durable and may be manufactured at a very low cost.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings.

Figure 1:
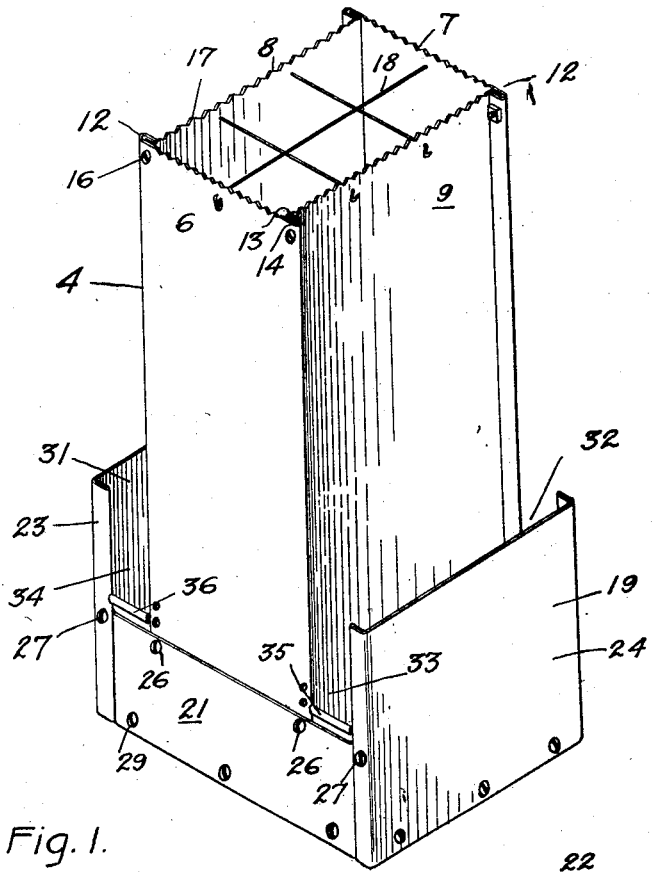
Figure 1 is a perspective view of the feeder of my invention, shown in assembled form.
Figure 3:
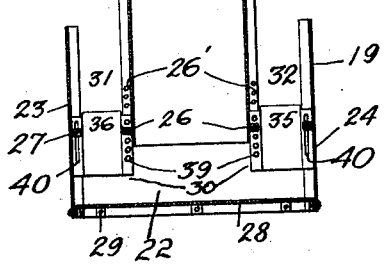
Figure 3 is a vertical sectional view of the feeder, the plane of the section being indicated by the line 3—3 of Figure 2.

As illustrated in the drawings, the feeder of my invention is made up of a plurality of separable sections, and comprises a feed reservoir 4 preferably of rectangular cross section and composed of opposed side walls 6 and 7 and opposed side walls 8 and 9. The walls 6 and 7 are arranged to be secured to the walls 8 and 9 by means of lock-seam joints 12, the cooperating parts 13 and 14 of which are formed on the contiguous edges of the adjoining walls. The assembly of the walls may be effected by inserting the seam parts 13 of the walls 8 and 9 into the seam parts 14 of the walls 6 and 7 while the walls are in end to end relation and then sliding each wall with respect to the contiguous wall until they become horizontally aligned as indicated in Figures 1 and 3 of the drawings. With the walls thus aligned, they are secured in position by suitable means, such as the stove bolts 16 which extend through the seam parts 13 and 14. It will now be clear that the reservoir walls provided with the lock seam joints as above described, not only will the ready assembly and attachment of the walls be permitted, but there will be no danger of the feed particles sifting thru the joints. Preferably the upper edges 17 of the reservoir walls are serrated to prevent roosting thereon, and as clearly shown in Figure 1, a wire guard 18 is disposed across the top of the reservoir.

The reservoir is arranged to be supported on a feeder receptacle 19 having opposed side walls 21 and 22, and opposed side walls 23 and 24, the former being positioned against the walls 6 and 7 and detachably secured thereto by bolts 26, while the latter are positioned in parallel spaced relation to the walls 8 and 9 and are arranged to be detachably connected to the walls 21 and 22 by bolts 27. A plate 28 serves as the bottom to the receptacle and is positioned inside the receptacle and secured to the walls thereof by means of stove bolts 29.

Figure 2:
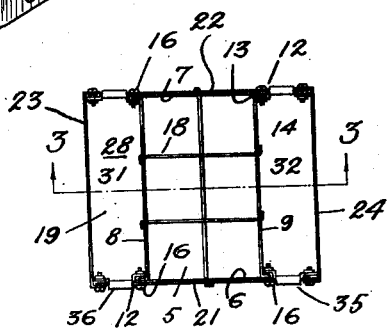
Figure 2 is a horizontal sectional view of the feeder as shown in Figure 1.

As will be clear by references to Figures 1 and 2, on opposite sides of the base of the reservoir, that is, between the walls 8 and 23 and between the walls 9 and 24 are respectively defined lateral extensions 31 and 32 of the receptacle. In the use of the device, the feed from the reservoir gravitates to the portion of the floor of the receptacle directly under the rservoir and to some extent depending on the consistency of the feed into the extensions 31 and 32 of the receptacle. The walls 23 and 24 are of such height as to prevent the poultry from reaching thereover, access to the feed within the receptacle being afforded the poultry, preferably exclusively, thru openings 33 and 34 defined above the walls 21 and 22 and between the flanged edges of the walls 8 and 23 and the walls 9 and 24. The walls 21 and 22, or such members as may be used in place thereof to define the bottoms of the feeder openings 33 and 34, while being substantially lower than the walls 23 and 24, are nevertheless designed to be of such height as to prevent poultry from raking feed thereover.

In order to regulate the amount of feed maintained in the receptacle, it is necessary to regulate the openings or clearance 30 at the bottom of the reservoir. Since in the present embodiment of the invention said openings or clearance is defined between the receptacle floor and the lower edge of the reservoir walls 8 and 9, this regulation is preferably provided for by adapting the reservoir for adjustable attachment to the receptacle, and accordingly the former is preferably provided with a plurality of vertically aligned openings 26' in any one of which the bolts 26 may be disposed to secure the members together in adjusted position.

In order that the feeder may be adaptable to use when desired by poultry of different sizes and variety without losing any of the efficiency of the feeder, means are provided for regulating the feeder openings 33 and 34. Preferably the regulation is effected in respect to the base of the openings, and accordingly the openings are defined at the base by the upper edges of gates or slides 35 and 36 which are mounted for vertical adjustment. The gates are conveniently secured in adjusted position by means of the bolts 26 which secure the reservoir to the receptacle, and as here shown vertically spaced apertures 39 are formed adjacent one edge of the gates for engagement by said bolts, while vertical slots 40 are formed in the outer edge of the gates for engagement by bolts 27 which serve to releasably clamp the side walls of the receptacle as well as to assist the bolts 26 in securing the gates in position.

From the foregoing it will now be understood that although access to the feed is confined to the feeder openings 33 and 34 so that it cannot be raked out and wasted, the poultry may reach the feed at any point in the receptacle including the area directly under the reservoir and can alternately, as is necessary or at least very desirable for poultry, pick up the feed and raise their heads, either for swallowing or for looking about without backing away from the feeder. Giving the poultry access to all parts of the receptacle, allows the poultry to reach feed that drops down through the reservoir and yet is too solid to flow or gravitate to the extensions 31 and 32 of the receptacle.

It will also now be apparent that the design of the feeder is such as to provide maximum efficiency as well as simplicity of construction, and since the feeder is arranged to be constructed practically entirely of sheet metal, it will possess advantages of light-construction without sacrificing the qualities of strength and durability. It will also be apparent that the feeder may be quickly taken apart, and that by reason of the fact that all the sections are practically flat, the feeder in knockdown form will occupy a minimum space for storage or shipment.

I claim:

1. A feeder of the character described, comprising a reservoir arranged to discharge the feed from the bottom thereof, a receptacle fixed to and positioned under said reservoir whereby it may receive the feed therefrom and provided with an extension protruding laterally of the reservoir, an obstruction adjacent the outer end of said extension preventing access thereover by the poultry to feed in the receptacle and being so spaced from the reservoir as to permit only the head portion of the poultry to have access to the feed over a side of the extension through the space between said obstruction and the reservoir.

2. A feeder of the character described, comprising a reservoir having a bottom feed discharge, a receptacle at the bottom of said reservoir adjustably secured thereto, and receptacle portions extending laterally of said reservoir and open on its upper side whereby the poultry may have access to the feed at the bottom of the reservoir, and obstructions adjacent the outer ends of said portions preventing access thereover by the poultry to said feed and permitting access to the feed over sides of the extensions through the spaces between opposed sides of said reservoir and said obstructions.

3. A poultry feeder of the character described, comprising a reservoir, a receptacle arranged to receive the feed therefrom and having receptacle portions extending laterally of and communicating with the reservoir, and obstructions on said extended portions preventing access thereover by the poultry to feed in said receptacle while permitting access by the poultry over the sides of said portions, there being unobstructed vertical spaces between the obstructions and sides of the reservoir opposed thereto, the discharge of feed from the reservoir being confined to passage from the sides thereof opposed to said obstructions.

4. A knock-down poultry feeder comprising a reservoir portion having opposed sets of walls and a receptacle portion arranged to receive the lower end of said reservoir and having opposed sets of walls, one of said last sets of walls being disposed against and secured to the corresponding walls of the receptacle, the other set of said receptacle walls being spaced from the corresponding walls of the reservoir to define receptacle extensions communicating with the interior of said reservoir, the walls defining said extensions providing feed openings thereto at and over only the sides of the extensions and preventing feeding at and over the outer ends of the extensions.

5. A feeder of the character described comprising a receptacle, and a reservoir adjustably secured to said receptacle and extending thereto, opposing walls of the reservoir and receptacle being spaced to define receptacle extensions communicating with the interior of the reservoir, certain of the walls of the extensions preventing the poultry from reaching thereover into the receptacle and other walls thereof permitting the poultry to have access thereover to the feed in the receptacle and flanges on certain of the walls of said extensions acting to prevent scattering of feed to resist the withdrawal of the necks of the poultry.

6. A feeder of the character described comprising a receptacle having opposing sets of side walls, the walls of one set being higher than the walls of the other, a reservoir extending into, and adjustably secured to, said receptacle and having corresponding sets of side walls, one set of the reservoir side walls being disposed against the lower side walls of the receptacle and the other set being spaced from the other set of the receptacle walls whereby receptacle extensions will be defined between the latter sets with openings at and above said lower side walls, and gates to vary the height of the lower edge of said openings.

In testimony whereof, I have hereunto set my hand at Auburn, California, this 23rd day of October, 1928.

AARON NORTON.